(12) United States Patent
Schwartz, II et al.

(10) Patent No.: US 7,746,551 B2
(45) Date of Patent: *Jun. 29, 2010

(54) VISION SYSTEM WITH EYE DOMINANCE FORCED TO FUSION CHANNEL

(75) Inventors: Sheldon Schwartz, II, Auburn, NH (US); Matthew W. Reed, New Boston, NH (US)

(73) Assignee: L-3 Insight Technology Incorporated, Londonerry, NH (US)

(*) Notice: Subject to any disclaimer, the term of this patent is extended or adjusted under 35 U.S.C. 154(b) by 587 days.

This patent is subject to a terminal disclaimer.

(21) Appl. No.: 11/608,954

(22) Filed: Dec. 11, 2006

(65) Prior Publication Data

US 2007/0103773 A1 May 10, 2007

Related U.S. Application Data

(63) Continuation-in-part of application No. 11/272,123, filed on Nov. 10, 2005, now Pat. No. 7,158,296.

(60) Provisional application No. 60/627,197, filed on Nov. 12, 2004, provisional application No. 60/645,097, filed on Jan. 20, 2005.

(51) Int. Cl.
*G02B 13/14* (2006.01)

(52) U.S. Cl. .................. 359/356; 359/407; 359/630

(58) Field of Classification Search .............. None
See application file for complete search history.

(56) References Cited

U.S. PATENT DOCUMENTS 7,158,296 B1 * 1/2007 Schwartz et al. ............ 359/407

* cited by examiner

*Primary Examiner*—Stephone B Allen
*Assistant Examiner*—Derek S Chapel

(57) ABSTRACT

A fusion vision system has a first eyepiece through which a fused viewable image is larger than an image viewed through a second eyepiece to help the operator more easily view the fused image in their brain. The fusion vision system may employ image intensification and infrared imaging capabilities.

20 Claims, 6 Drawing Sheets

VISION SYSTEM WITH EYE DOMINANCE FORCED TO FUSION CHANNEL

CROSS REFERENCE TO RELATED APPLICATIONS

This application is a continuation-in-part application of and claims the benefit of U.S. patent application Ser. No. 11/272,123, filed Nov. 10, 2005, now U.S. Pat. No. 7,158,296, the entire disclosure of which is incorporated herein by reference and which claims the benefit of U.S. Provisional Application Ser. No. 60/627,197, filed Nov. 12, 2004, and U.S. Provisional Application Ser. No. 60/645,097, filed Jan. 20, 2005.

BACKGROUND OF THE INVENTION

Night vision systems include image intensification ($I^2$), thermal imaging, and fusion monoculars, binoculars, bioculars, and goggles, whether hand-held, weapon mounted, or helmet mounted. Standard night vision systems are typically equipped with one or more image intensifier tubes to allow an operator to see visible wavelengths of radiation and the lower portion of the infrared light spectrum (approximately 400 nm to approximately 900 nm). They work by collecting the tiny amounts of light that are present but may be imperceptible to our eyes, and amplifying it to the point that an operator can easily observe the scene. These devices have been used by soldier and law enforcement personnel to see in low light conditions, for example at night or in caves and darkened buildings. These devices take ambient light and magnify the light up to and in excess of 50,000 times and display the image for viewing through an eyepiece. A drawback to night vision goggles is that they cannot see through smoke and heavy sand storms and cannot see a person hidden under camouflage.

Infrared thermal sensors allow an operator to see people and objects because they emit thermal energy. These devices operate by capturing the upper portion of the infrared light spectrum, which is emitted as heat by objects instead of simply reflected as light. Hotter objects, such as warm bodies, emit more of this wavelength than cooler objects like trees or buildings. Since a primary source of infrared radiation is heat or thermal radiation, any object that has a temperature radiates in the infrared. One advantage of infrared sensors is that they are less attenuated by smoke and dust and a drawback is that they typically do not have sufficient resolution and sensitivity to provide acceptable imagery of the scene.

Fusion night vision systems have been developed that combine image intensification with thermal sensing. The image intensification information and the infrared information are fused together to provide a combined image that provides benefits over just image intensification or just thermal sensing. The image may be fused optically or electronically.

With binocular fusion night vision systems, either the fused image appears in both the left and the right eyepiece, or one eyepiece has the fused image and the other eyepiece has either just image intensification information or just thermal information. Having different information in the two eyepieces can make it more difficult for the operator to comprehend the scene.

Fusion night vision systems are typically used by the military and law enforcement personnel and are either hand carried or mounted to a helmet. These devices include image intensification tubes, focal plane arrays, and displays that take up space, add to the system weight and cost, and consume power. A reduction in the quantity of components is desirable.

BRIEF DESCRIPTION OF THE DRAWINGS

Features and advantages of the invention are set forth by description of embodiments consistent therewith, which description should be considered along with the accompanying drawings, wherein.

DETAILED DESCRIPTION

Figure 1:
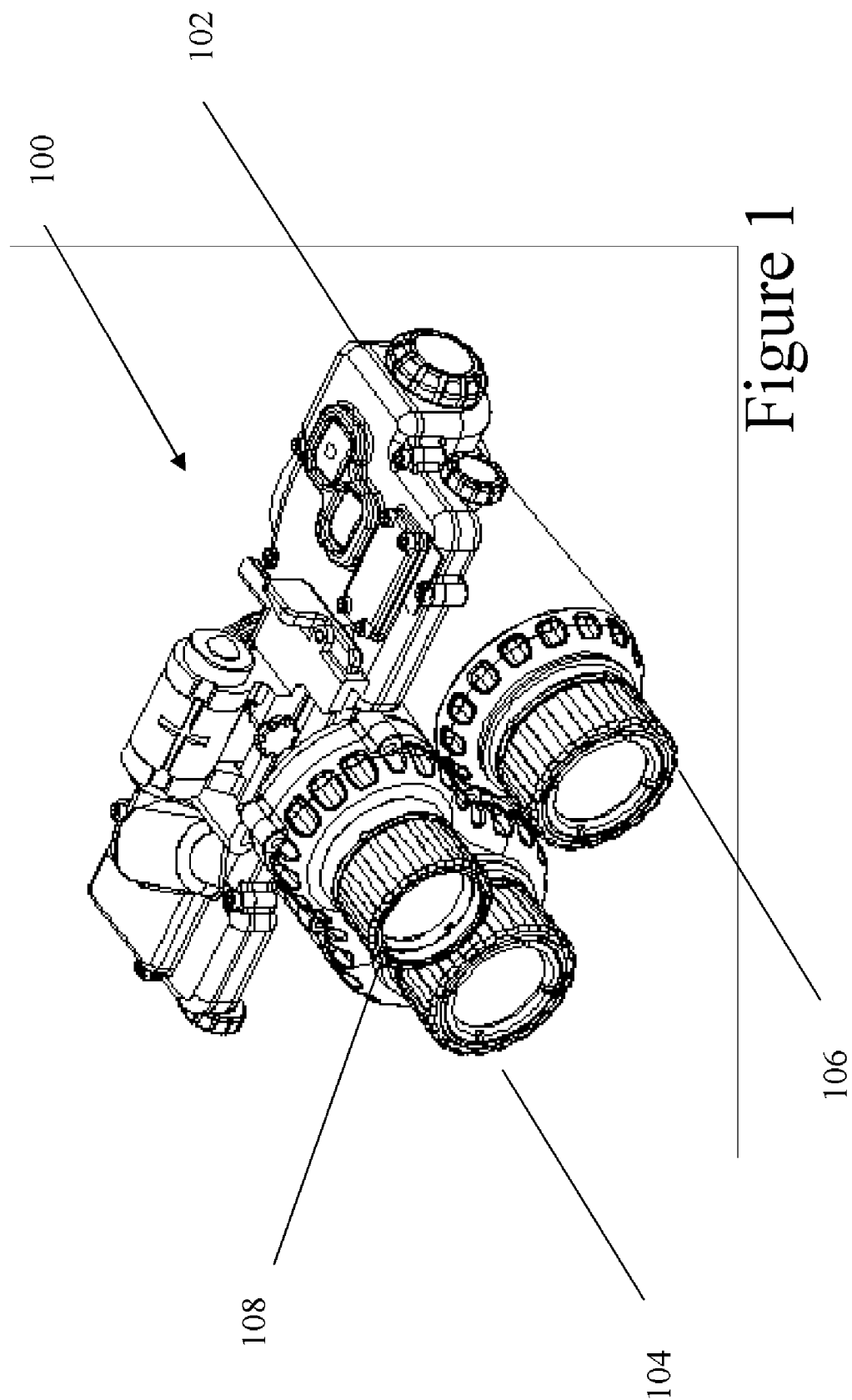
FIG. 1 is an isometric view of a fusion vision system consistent with one embodiment of the invention.
Figure 2:
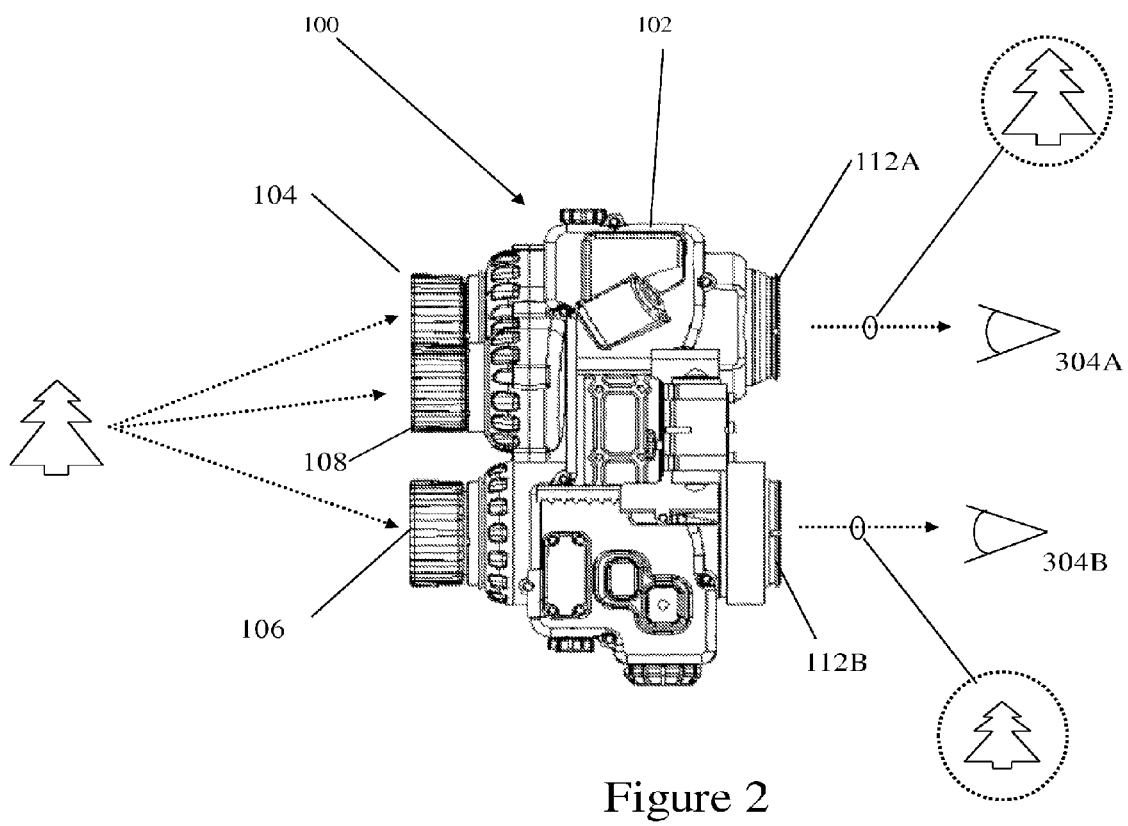
FIG. 2 is a top view of the fusion vision system of FIG. 1.

FIGS. 1 and 2 are views of a fusion vision system 100 consistent with one embodiment of the present invention. The fusion vision system 100 may have a housing 102, a first image intensification channel 104, a second image intensification channel 106, and an infrared channel 108. The first and second image intensification channels 104, 106 may be configured to process information in a first range of wavelengths (for example the visible portion of the electromagnetic spectrum and a portion of the near infrared spectrum from approximately 400 nm to 900 nm) and the infrared channel 108 may be configured to process information in a second range of wavelengths (for example approximately 750 nm-14,000 nm). The low end and the high end of the ranges of wavelengths may vary without departing from the invention. The system 100 may be mounted to a military helmet and powered by a removable battery pack 110 (see FIG. 3). An operator can view a scene through a right eyepiece 112A and a left eyepiece 112B. Information from the first image intensification ($I^2$) channel 104 may be fused with the information from the infrared channel 108 and presented for viewing through the right eyepiece 112A and information from the second $I^2$ channel 106 may be presented for viewing through the left eyepiece 112B. The eyepieces 112A, 112B may have one or more ocular lenses.

Figure 3:
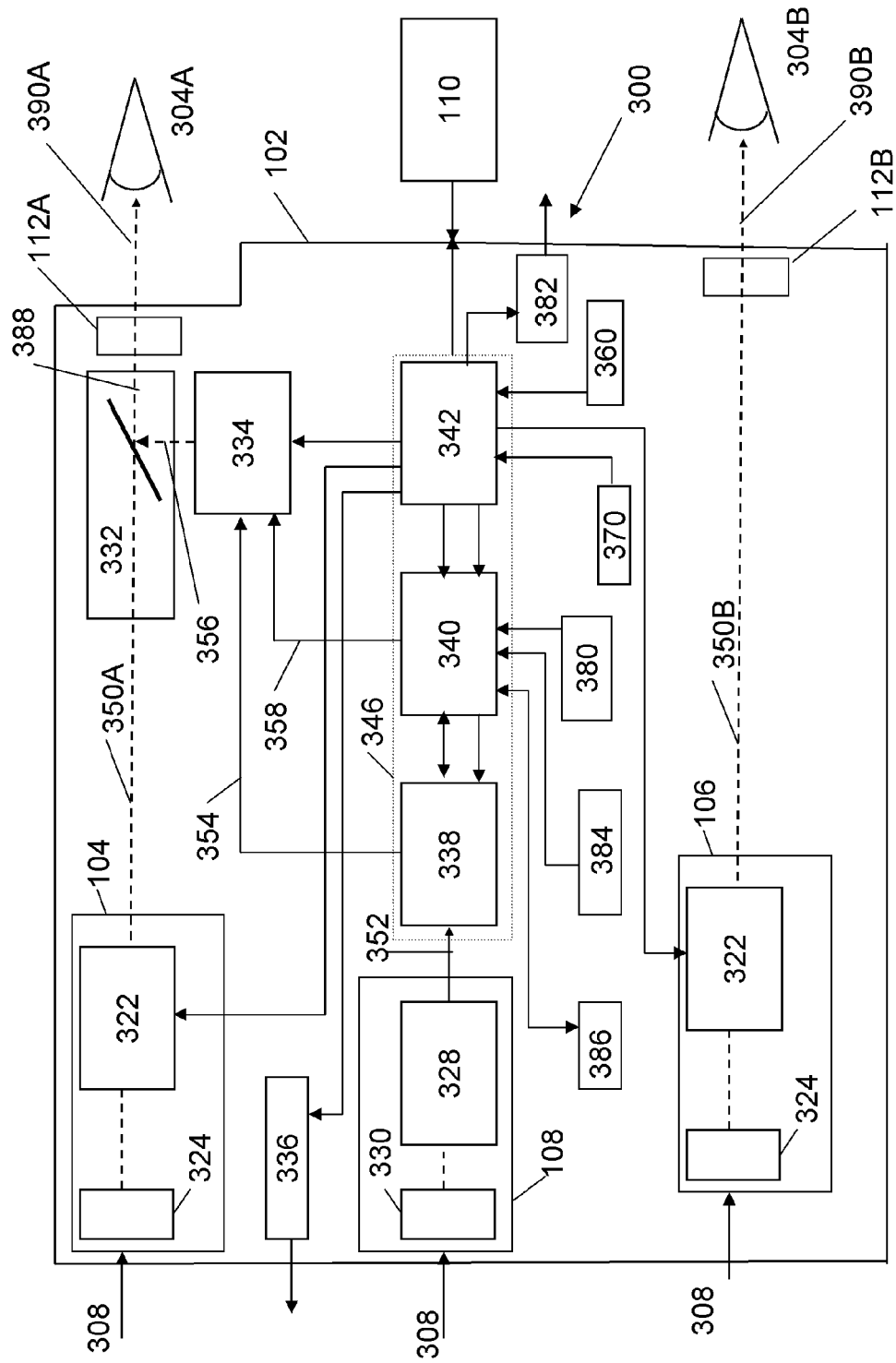
FIG. 3 is a block diagram of a fusion vision system consistent with another embodiment of the invention.
Figure 3A:
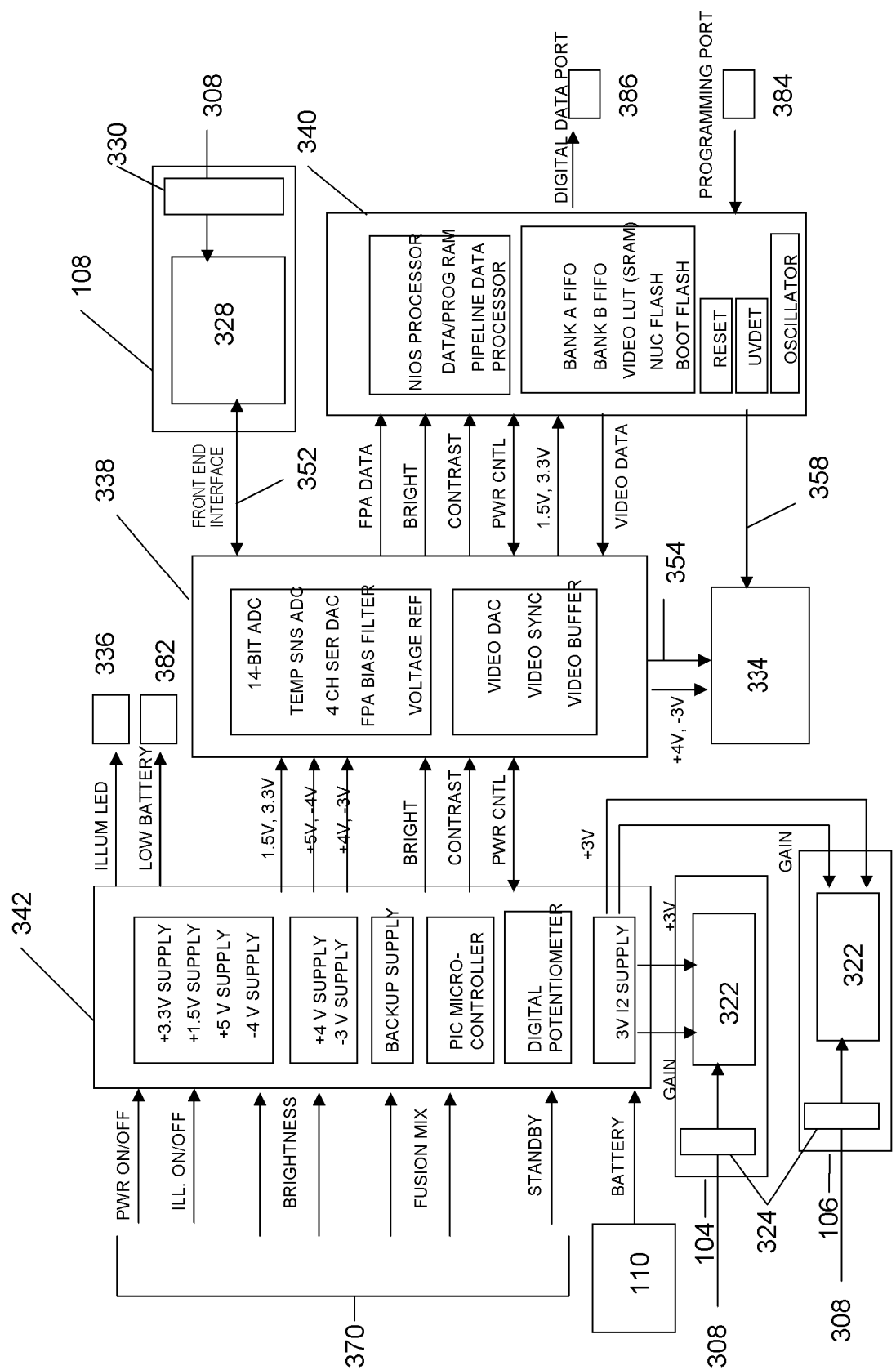
FIG. 3A is a block diagram detailing interconnections between blocks shown in FIG. 3.

FIG. 3 is a block diagram of a fusion vision system 300 consistent with another embodiment of the invention. The electronics and optics may be housed in the housing 102. Information from the first $I^2$ channel 104 and the infrared channel 108 may be fused together and presented for viewing to an operator's right eye 304A. Although reference will be made several times to the right eye, the fused image alternatively may be presented for viewing in the operator's left eye without departing from the invention. The first $I^2$ channel 104 and the second $I^2$ channel 106 may each have an objective focus 324 and an $I^2$ tube 322 for viewing a scene 308. Suitable $I^2$ tubes 322 may be Generation III tubes and are available from Northrop Grumman and ITT. Image 350A from the first $I^2$ 104 may be directed into a combiner optic 332, for example a partially reflective beam splitter.

The infrared channel 108 may have an objective focus 330 and an infrared sensor 328, for example a short wave infrared sensor, for example an electronic bombardment active pixel simulation sensor (EBAPS) or a thermal sensor, for example a focal plane array or microbolometer. Other infrared sensors may be used without departing from the invention. An analog signal 352 from the infrared sensor 328 may be inputted into a circuit assembly 346 possibly having an analog circuit card assembly 338, a digital circuit card assembly 340, and a power and control circuit card assembly 342. An analog video out signal 354 from the analog circuit card assembly 338 may be inputted into a display 334. A serial bus 358 coupled to the digital circuit card assembly 340 may control the size, resolution, and offset of the display 334. The display 334 may be a miniature flat panel display, for example a yellow monochrome organic light emitting diode (OLED) microdisplay.

Additionally, the display 334 may be used to present additional information needed by the operator. The additional information may include text, numbers, symbology, illustrations, and icons. The information may include commands from headquarters, operator global coordinates, distance to target, vehicle control/operating information, etc.

$I^2$ image 350A from the first channel 104 and image 356 from the display 334 may be directed into the combiner optics 332 to generate a fused image 388 which may then be directed into the right eyepiece 112A for presentation to the viewer's right eye 304A as a first viewable image 390A. $I^2$ image 350B from the second $I^2$ channel 106 may be directed into the left eyepiece 112B for presentation to the viewer's left eye 304B as a second viewable image 390B.

The fusion vision system 300 may have an illumination LED 336 and a plurality of user actuatable actuators 370, a programming port 384, a digital data port 386 for transferring data, and a low battery signal generator 382. The plurality of actuators 370 may allow the operator to turn the system 300 on and off, scroll through menus viewable through the right eyepiece 112A, and make a selection. The actuators 370 may employ a silicone overlay over tactile dome switches. The overlay may be coupled to the housing 102 to seal out moisture and particulates and the dome switches may be coupled to the circuit assembly 346.

Eye Dominance typically refers to the eye that the brain "prefers" or one that has stronger "processing" in the brain than the other. People usually have one eye that likes to "take over" when binocular vision is impaired, or one eye that is more sensitive to visual discrimination.

If a fused image is presented to an operator in their non-dominant eye, it may be more difficult for the operator to comprehend the scene. Eye dominance may be "forced" to a non-dominant eye by increasing the image size in the non-dominant eye over the image size in the dominant eye. A fusion vision system consistent with one embodiment of the invention may be used by operators with left or right eye dominance without departing from the invention.

Right eyepiece 112A and left eyepiece 112B may be configured, for example by magnification or demagnification, to make fused viewable image 390A appear larger than viewable image 390B, for example by 0.5%-10%, more particularly 2-4%, and more particularly 3%. This may help the operator to more easily combine the image intensification information with the infrared information in their brain.

In an alternative embodiment, scaling of the viewable images may be done at the objective lenses 324, 330 and/or at the display 334, or a combination thereof.

The fusion vision system 300 may be called upon by the operator to view the scene 308 in a variety of adverse conditions, for example in very low light conditions, through smoke or heavy fog, and sand storms. In each of these conditions the operator may wish to rely more heavily on the first and second channels 104, 106 ($I^2$) than the third channel 108 (infrared) and in other conditions the user may wish to rely more heavily on the third channel 108 than the first and second channels 104, 106. The fusion vision system 300 may have one or more actuators to control the mix of information from the first and second channels 104, 106 and the third channel 108 viewable through the eyepiece 112A, 112B. At one extreme the viewable image 390A contains generally 100% $I^2$ information, at the other extreme the viewable image 390A contains generally 100% infrared information, and in between the two extremes, the circuit assembly 346 provides a mix of $I^2$ and infrared information. A mix actuator/s 360 may be coupled to a microcontroller on the circuit assembly 346 that controls the gain of the $I^2$ tubes 322 and the contrast and brightness of the infrared image presented in the display 334. The microcontroller may control a digital potentiometer coupled to the gain control input of the $I^2$ tube. The fusion vision system 300 may be configured to maintain a perceived brightness of the fused image 388 over a range of $I^2$ and infrared mixes.

The fusion vision system may also include a parallax compensation circuit to compensate for the channels 104, 106, 108 being offset from each other. The longitudinal axis of the first channel 104 and the third channel 108 may be factory aligned such that the infrared image 356 of a scene from the infrared channel 108 and $I^2$ image 350A from the $I^2$ channel 104 are aligned on the image combiner 332 when the target is at the predetermined distance, for example infinity. Note that the channels can be offset in the horizontal direction, the vertical direction, or as shown in a combination. When the channels are offset in the vertical direction, the processor may compensate by offsetting images up or down in the display 334 and when the channels are offset in the horizontal direction, the processor may compensate by offsetting images left or right in the display 334 to ensure infrared image 356 and the $I^2$ image 350A are aligned when viewed through the eyepiece 112A. A range finder may be utilized to determine the distance to target.

In an alternative embodiment, the fusion vision system 300 may accept inputs from a user regarding the distance to target. The input may be received through a near/far actuator or a menu selection. The fusion vision system 300 may be designed so the operator selects the far mode when the object being viewed is greater than 10 meters away and the operator selects the near mode when the object being viewed is less than 10 meters away. Distances other than 10 meters may be chosen without departing from the invention. The fusion vision system 300 may also incorporate multiple distance choices, for example close, less than 5 meters; mid range, 5-20 meters; and long range, greater than 20 meters, without departing from the invention.

It has been discovered that target locating and identification can be improved with edge detection of the infrared image. An edge detection circuit may be used without departing from the invention.

Fusion vision systems may be used at night with a weapon having an infrared laser illuminator aligned with the bore of the weapon. The fusion vision system 300 allows the operator to aim and fire the weapon without having to look through a scope. The operator may locate the target using the infrared channel information and align the weapon with the $I^2$ channel information. When attempting to acquire a target using a fusion vision system having automatic gain control of the infrared and the $I^2$ channels, the $I^2$ information from the laser illuminator may swamp the eyepiece making locating the target more difficult. To overcome this problem, the operator may switch the fusion vision system into a "targeting mode" when trying to acquire a target. After the system receives an enter targeting mode signal the system may turn down the gain from the $I^2$ tubes using a digitally controlled potentiometer and reduce CCD electronic gain by reducing electronic shutter period, and leave the automatic gain of the infrared channel enabled. Targeting mode may be accessed through a dedicated actuator or through a menu.

Figure 4:
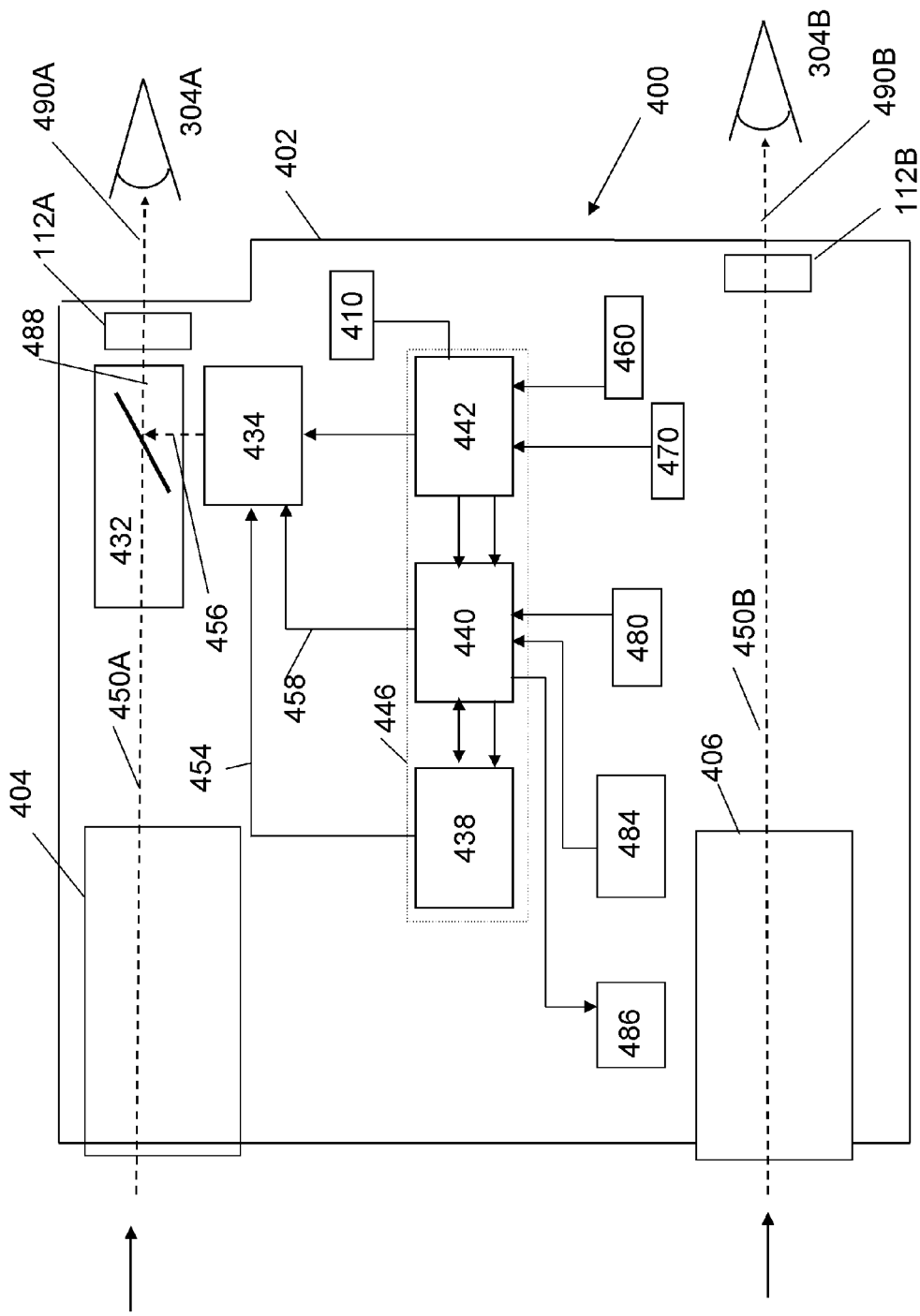
FIG. 4 is a block diagram of a fusion vision system consistent with another embodiment of the invention.

FIG. 4 is a block diagram of a fused vision system 400 consistent with another embodiment of the invention. The vision system 400 may have a housing 402, a first optical channel 404, a second optical channel 406, a display 434, and an image combiner 432. The first and second optical channels 404, 406 may be configured to image a scene in the visible spectrum (from approximately 400 nm to 750 nm) without an $I^2$ tube. First and second optical channels 404, 406 may include a series of lenses for magnifying a scene. The system 400 may be hand-held or mounted to a military helmet and have an internal battery 410 or a removable battery pack. An operator can view a scene through a right eyepiece 112A and a left eyepiece 112B. The display 434 may display graphical information received from a circuit assembly 446. The graphical information may include, but is not limited to, commands received from a remote location, operator global coordinates, distance to target, vehicle control/operating information, etc.

The circuit assembly 446 may have an analog circuit card assembly 438, a digital circuit card assembly 440, and a power and control circuit card assembly 442. An analog video out signal 454 from the analog circuit card assembly 438 may be inputted into the display 434. A serial bus 458 coupled to the digital circuit card assembly 440 may control the size, resolution, and offset of the display 434. The display 434 may be a miniature flat panel display, for example a yellow monochrome organic light emitting diode (OLED) microdisplay. The circuit assembly 446 may receive information from an on board range finder 460 or a global positioning system or compass 480. The circuit assembly 446 may also receive information through a receiver 484 from a remote location, for example from another soldier, an aircraft, or headquarters. The circuit assembly may also transmit information through a transmitter 486 to a remote location. The fused vision system 400 may also have a plurality of user actuatable actuators 470 that may allow the operator to turn the system on and off, scroll through menus viewable through the right eyepiece 112A, and make a selection.

Image 450A from the first optical channel 404 may be fused with graphical information 456 and presented as a fused image 488 which may then be directed into the right eyepiece 112A for presentation to the viewer's right eye 304A as a first viewable image 490A. Information 450B from the second optical channel 406 may be directed into the left eyepiece 112B for presentation to the viewer's left eye 304B as a second viewable image 490B. The image 450A from the first optical channel 404 and the graphical information 456 may be fused in the image combiner 434, for example a partially reflective beam splitter. Although reference will be made several times to the right eye, the fused viewable image alternatively may be presented for viewing in the operator's left eye without departing from the invention. The eyepieces 112A, 112B may have one or more ocular lenses.

Right eyepiece 112A and left eyepiece 112B may be configured, for example by magnification or demagnification, to make the first (fused) viewable image 490A appear larger than the second (non-fused) viewable image 490B, for example by 0.5%-10%, more particularly 2-4%, and more particularly 3%. This may help the operator to more easily combine the scene information with the graphical information in their brain.

In an alternative embodiment, scaling of the viewable images may be done in the first and second optical channels 404, 406 and/or at the display 434, or a combination thereof.

Figure 5:
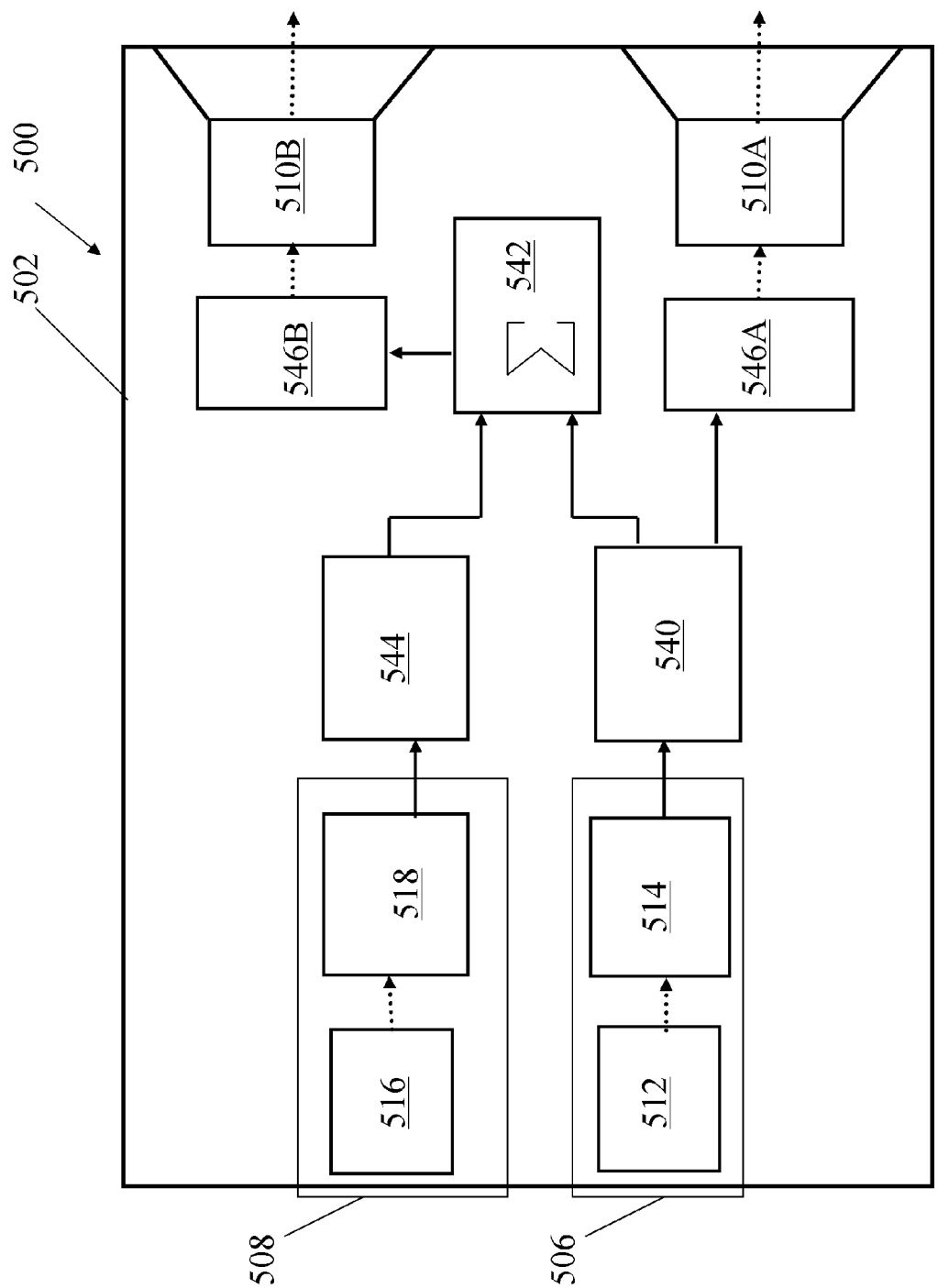
FIG. 5 is a block diagram of a fusion vision system consistent with another embodiment of the invention.

FIG. 5 is a block diagram of a fused vision system 500. The electronics and optics may be housed in a housing 502, which can be mounted to a military helmet, and are powered by batteries. Information from an image intensification ($I^2$) channel 506 and an infrared channel 508 are fused together for viewing by an operator through one or more eyepieces 510. The eyepieces 510 have one or more ocular lenses for magnifying and/or focusing the fused image. The $I^2$ channel 506 is configured to process information in a first range of wavelengths (the visible portion of the electromagnetic spectrum and a portion of the near infrared spectrum from 400 nm to 900 nm) and the infrared channel 508 is configured to process information in a second range of wavelengths (750 nm-14,000 nm). The $I^2$ channel 506 has an objective focus 512 and an $I^2$ tube 514 and the infrared channel 508 has an objective focus 516 and an infrared sensor 518, for example a short wave infrared sensor, for example an electronic bombardment active pixel simulation sensor (EBAPS) or a thermal sensor, for example a focal plane array or microbolometer.

The $I^2$ information may be coupled to a charge-coupled device (CCD) and electronics 540 and the infrared information may be coupled to signal processing electronics 544. The output from the CCD and electronics 540 may be inputted into both the mixing/display electronics 542 and a first display 546A for viewing through eyepieces 510A. The output from the signal processing electronics 544 may be inputted into mixing/display electronics 542. The fused analog video signal output of the mixing/display electronics 542 may then be coupled to a second display 546B for viewing through eyepieces 510B. The mixing/display electronics 542 may be configured to modify the size of the fused image so that the fused image appears larger in the second eyepiece 510B than the non-fused image appears in the first eyepiece 510A. Alternatively, an ocular lens assembly in one of the first and second eyepieces 510A, 510B may modify the size of the fused image so that the fused image appears larger in the second eyepiece 510B than the non-fused image appears in the first eyepiece 510A.

In one aspect there is provided a binocular vision system that may include a housing, a first channel configured to image a scene in a first range of wavelengths, a second channel configured to image a scene in a second range of wavelengths, a combiner configured to generate a fused image from an image from the first channel with an image from the second channel, a first display aligned with a first eyepiece for projecting the fused image, and a second display aligned with a second eyepiece for projecting the image from the first channel. The system configured such that the fused image when viewed through the first eyepiece is larger than the image from the first channel when viewed through the second eyepiece.

In another aspect there is provided a binocular vision system that may include a housing, an image intensification channel coupled to the housing and configured to image a scene in the visible spectrum, an infrared channel coupled to the housing and configured to image a scene in the infrared spectrum, a combiner configured to generate a fused image from the image intensification channel and the infrared channel, a first display aligned with a first eyepiece for projecting the fused image, and a second display aligned with a second eyepiece for projecting the image from the image intensification channel. The system configured such that the fused image when viewed through the first eyepiece is larger than the image from the first channel when viewed through the second eyepiece.

In another aspect there is provided a method of viewing a scene including the steps of imaging a scene in a first range of wavelengths in a first channel, imaging the same scene in a second range of wavelengths in a second channel, directing an image from the first channel to a first display aligned with a first eyepiece, combining the image from the first channel with an image for the second channel to form a fused image, and then manipulating the fused image and directing it to a second display aligned with a second eyepiece so that the fused image when viewed through the second eyepiece is 2-4% larger than the image from the first channel when viewed through the first eyepiece.

Although several embodiments of the invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

What is claimed is:

1. A binocular vision system, comprising:
    a housing;
    a first channel coupled to the housing and configured to image a scene in a first range of wavelengths;
    a second channel coupled to the housing and configured to image a scene in a second range of wavelengths;
    a combiner configured to generate a fused image from information from the first channel with information from the second channel;
    a first display aligned with a first eyepiece for projecting the fused image; and
    a second display aligned with a second eyepiece for projecting an image from the information from the second channel, wherein the fused image when viewed through the first eyepiece is larger than the image from the second channel when viewed through the second eyepiece.

2. The binocular vision system of claim 1, wherein the first range of wavelengths is approximately 7,000 nm to approximately 14,000 nm and the second range of wavelengths is approximately 400 nm to approximately 900 nm.

3. The binocular vision system of claim 1, wherein the combiner is a selected one of a digital fusion mixer and an analog fusion mixer.

4. The binocular vision system of claim 3, wherein the image combiner is a beam splitter.

5. The binocular vision system of claim 1, wherein the first channel has an objective focus and a focal pane array and the second channel has an objective focus and an image intensification tube.

6. The binocular vision system of claim 1, wherein the first eyepiece is configured to magnify the fused image 1-10% larger than the image viewed through the second eyepiece.

7. The binocular vision system of claim 6, wherein the first eyepiece is configured to magnify the fused image 2-4% larger than the image viewed through the second eyepiece.

8. The binocular vision system of claim 1, further comprising signal processing electronics coupled to the first channel and a charge-coupled device coupled to the second channel.

9. The binocular vision system of claim 8, wherein an output of the charge-coupled device is inputted into the combiner and the second display.

10. The binocular vision system of claim 1, wherein an output of a signal processing electronics is inputted into the combiner.

11. The binocular vision system of claim 1, wherein the combiner outputs a fused analog video signal image to the first display.

12. The binocular vision system of claim 11, wherein the combiner comprises mixing/display electronics.

13. The binocular vision system of claim 12, wherein the mixing/display electronics is configured to modify the size of the fused image so that the fused image appears 2-4% larger in the first eyepiece than a non-fused image appears in the second eyepiece.

14. A binocular vision system, comprising:
    a housing;
    an image intensification channel coupled to the housing and configured to image a scene in the visible spectrum;
    an infrared channel coupled to the housing and configured to image a scene in the infrared spectrum;
    a combiner configured to generate a fused image from the image intensification channel and the infrared channel;
    a first display aligned with a first eyepiece for projecting the fused image; and
    a second display aligned with a second eyepiece for projecting an image from the second channel, wherein the fused image when viewed through the first eyepiece is larger than the image from the second channel when viewed through the second eyepiece.

15. The binocular vision system of claim 14, wherein the combiner is a selected one of a digital fusion mixer, an analog fusion mixer, and a beam splitter.

16. The binocular vision system of claim 14, wherein the infrared channel has an objective focus and a focal pane array and the image intensification channel has an objective focus and an image intensification tube.

17. The binocular vision system of claim 14, wherein the first eyepiece is configured to magnify the fused image 2-4% larger than the image viewed through the second eyepiece.

18. The binocular vision system of claim 14, wherein the combiner comprises mixing/display electronics.

19. The binocular vision system of claim 18, wherein the mixing/display electronics is configured to modify the size of the fused image so that the fused image appears 2-4% larger in the first eyepiece than a non-fused image appears in the second eyepiece.

20. A method of viewing a scene, comprising the steps of:
    imaging a scene in a first range of wavelengths in a first channel;
    imaging the scene in a second range of wavelengths in a second channel;
    directing an image from the first channel to a first display aligned with a first eyepiece;
    combining the image from the first channel with an image for the second channel to form a fused image; and
    manipulating the fused image and directing it to a second display aligned with a second eyepiece so that the fused image when viewed through the second eyepiece is 2-4% larger than the image from the first channel when viewed through the first eyepiece.

* * * * *